United States Patent [19]

Uemura et al.

[11] Patent Number: 5,701,634
[45] Date of Patent: Dec. 30, 1997

[54] GROMMET

[75] Inventors: Kazuhiro Uemura; Koji Yamashita, both of Yokkaichi, Japan

[73] Assignee: Sumitomo Wiring Systems, Ltd., Japan

[21] Appl. No.: 695,859

[22] Filed: Aug. 9, 1996

[51] Int. Cl.[6] .................................................. F16L 5/00
[52] U.S. Cl. ............................ 16/2.1; 16/2.5; 174/152 G
[58] Field of Search ............................ 16/2.1, 2.2, 2.5; 174/151, 152 R, 152 G, 153 R, 153 G

[56] References Cited

U.S. PATENT DOCUMENTS

| | | | |
|---|---|---|---|
| 2,225,472 | 12/1940 | Franklin | 174/153 G |
| 2,375,373 | 5/1945 | Leathers | 174/153 G |
| 2,707,723 | 5/1955 | Moorhead | 174/153 G |
| 2,897,533 | 8/1959 | Bull et al. | 16/2 |
| 3,099,057 | 7/1963 | Cook | 16/2 |
| 4,487,998 | 12/1984 | Pegram | 174/153 G |
| 4,797,513 | 1/1989 | Ono et al. | |
| 5,388,915 | 2/1995 | Huber | |
| 5,453,579 | 9/1995 | Cohea | 174/152 G |

FOREIGN PATENT DOCUMENTS 2 402 323  3/1979  France.

*Primary Examiner*—Chuck Y. Mah
*Attorney, Agent, or Firm*—Anthony J. Casella; Gerald E. Hespos; Ludomir A. Budzyn

[57] ABSTRACT

A grommet (1) is provided for sealing an opening in a panel, through which at least one cable passes, comprising a tapered hollow body which sealingly engages the cable at least at a first end (10) and the edge of the opening via a groove (30) formed on a second end (20), wherein at least one means for reducing stiffness, in particular a recess (12, 14, 16) is provided on an inner surface (5) and/or on an outer surface (6) of the hollow body, so that elastic deformation of the grommet (1), in particular of its second end (2) is facilitated.

20 Claims, 3 Drawing Sheets

GROMMET

BACKGROUND OF THE INVENTION

1. Field of the Invention

The present invention relates to a grommet for sealing an opening in a panel through which at least one cable passes and, more particularly to a grommet used in the automotive industry for sealing an opening in a panel separating the engine compartment from the passenger compartment against water, heat and dirt, through which panel at least one cable or wiring harness passes.

2. Description of the Prior Art

There are generally known three types of grommets. From U.S. Pat. No. 3,424,857, a grommet is known which is plugged into the opening so as to deform a tapered front body portion for allowing the engagement of the panel in a groove provided therefor. This type of grommet is either fully formed of rubber or is filled after insertion with a reinforcement material, e.g. cement.

This type of grommet is easily insertable. However, the engagement of the groove with the panel is poor if no reinforcement material is provided and, when the reinforcement material is used, the mounting of the grommet needs a lot of time and labor.

A second known grommet consists of two portions which are joined via the opening in the panel through which the cable passes and which is to be sealed. Such a grommet is known from U.S. Pat. No. 4,839,937. The two parts of this grommet are placed on the opposite sides of the panel.

A third type of grommet is known from the JP-A-108122/1988. This type of grommet comprises a tapered hollow body which is provided with a groove for the engagement with the edge of the opening in the panel. From the JP-A-108122/1988, it is further known to provide a recess in the groove or in the front face of the grommet in order to provide a groove with a self-adjusting width.

The subject matter of the present invention is directed to the last type of grommet. For mounting the known grommet into the panel, the grommet is usually deformed, and then urged by hand through the opening (first step). Afterwards, the grommet is pulled at the tapered end until the engagement between the groove and the panel is obtained (second step). Usually, the operator is required to use both hands to deform the grommet so as to pass it through the opening and to pull the grommet backward to deform the main body thereof so that the grommet engages the panel.

Lastly, space available for mounting the grommet, particularly in the automotive industry was diminished. It was often not possible to use both hands for the above mentioned operation.

It is an object of the present invention to provide a grommet which can be easily mounted, has a simple construction, and is producible at a reduced cost while maintaining a perfect sealing.

SUMMARY OF THE INVENTION

The subject invention is directed to a grommet for sealing an opening in a panel through which at least one cable passes. The grommet comprises a tapered hollow body which sealingly engages the cable at least at a first end and the edge of the opening via a groove formed on a second end. On an inner surface and/or on an outer surface of the hollow body of the grommet, means for reducing stiffness is provided. The means for reducing stiffness is preferably formed by a recess. The means for reducing stiffness is provided such that the elastic deformation of the grommet, in particular of its second end having a larger diameter than the first end is facilitated.

The grommet is preferably formed unitarily of rubber by molding, and is formed by comolding if several materials are used in combination. By providing the means for reducing stiffness on either one or both radial surfaces of the main body of the grommet, in particular close to the second end which is provided in form of a flange having a larger diameter than the first end, the grommet, in particular the second end portion and/or the tapered portion are more easily deformable. On one hand, easier deformation ensures easier insertion of the grommet through the opening in the panel during the first operation step. On the other hand, when the grommet is pulled backward to be engaged with the panel, the main body thereof can be deformed by the radial pressure applied by the edge of the opening when an axial force is applied to the grommet. The easier deformation largely reduces the required axial force for pulling the grommet until the snap engagement of the groove with the panel, thereby enabling this action to be performed solely by one hand. Thus, a grommet is provided which can be mounted even if only a restricted space is available. The means for reducing stiffness is provided on a radially inner or radially outer surface of the hollow body or formed as recesses the radial depths of which might correspond approximately to the half of the material thickness without the recess.

Preferably, a recess is provided behind the groove when seen in the axial direction from the second end. By providing such a recess, the void area of the recess can accommodate or receive the material of the hollow body that is deformed by the radial force applied to the hollow body by the edge of the opening in the panel upon actual thrust on the grommet. Alternatively or in combination, it is preferred that a recess be provided before the groove when seen in the axial direction from the second end. By providing this alternative or supplementary recess, the second end in form of a flange is more easily deformable, which specifically helps when deforming the grommet in order to allow the inserted end to pass through the opening in the panel.

Preferably, a recess is provided at a location substantially within the area of the bottom of the groove, wherein the width of the recess is preferably smaller than the width of the groove.

A plurality of means for reducing stiffness can be provided on the same grommet. Any combination of the aforementioned recesses can be used in order to achieve a desired flexibility while the elastic restoring force of the grommet is maintained at a level which is sufficient to securely engage the panel via the groove. The means for reducing stiffness may be directly formed during the production of the grommet. Specifically, this means is formed by providing projections in the mold in order to form recesses on the inner and/or outer radial surface of the hollow body. Alternatively, the means for reducing stiffness, in particular recesses may be formed after the production of the grommet by removal of material by suitable means such as blades, heat treatment or the like.

It is preferred that the recess or recesses extend over the entire circumference of the hollow body so that no specific orientation of the grommet is necessary when the grommet is mounted to the panel. However, on some occasions, webbing may be provided to enhance the stiffness of localized areas of the grommet if required.

Alternatively or additionally to the recess, the means for reducing stiffness comprises preferably a more flexible or elastic material, which is most preferably comolded with the rubber material of the grommet in order to enhance productivity.

It is further preferred that the groove of the grommet have the largest width at the bottom thereof. Particularly, it is preferred that the groove have a substantially triangular or L-shaped cross section in order to optimally receive a flange of the panel portion therein, which is usually L-shaped in the automotive industry. However, the groove can obviously have other forms which conform to the form of the edge of the panel, in which an opening is formed.

The edges of the groove are preferably provided as sealing lips. By providing a line contact between the grommet and the panel, a determinable sealing function can be achieved. Specifically, the elastic restoring force of the grommet, acting as a line pressure at the sealing lip provides better protection against intrusion of fluid and dirts. Contrary to the surface sealing function between the grommet and the panel, fluid film formation is avoided by the use of the sealing lips. Of course, further sealing lips can be provided along the groove, wherein mating recesses can also be formed in the panel to obtain an even better engagement.

A radial projection which serves as a sealing lip may preferably be provided at the bottom of the groove, wherein the recess, if provided at a location substantially within the area of the bottom of the groove, is preferably offset with respect to that projection such that the reduced stiffness does not impair the action of the sealing lip.

Finally, the tapered portion of the grommet at least adjacent to the groove of the hollow body is preferably formed of a more elastic material and/or in a wave form so that this portion is more easily deformable. This preferred feature is specifically directed to the second step of operation, i.e. the pulling of the grommet for deforming the tapered portion until the engagement of the groove with the edge of the panel is achieved. The grommet may include more elastic material than rubber. However, it is also possible to form a flange comprising the groove and to connect therewith the tapered portion of the more elastic material including the first end for sealingly receive a cable or a wiring harness.

The invention relates also to the use of the above defined grommet for sealingly passing a wiring harness through a panel and, particularly to the use of a grommet in the automotive industry, where such a grommet is usable for sealingly passing a wiring harness through a panel which separates the engine compartment from the passenger compartment.

BRIEF DESCRIPTION OF THE DRAWINGS

Further features and advantages of the grommet according to the present invention will become readily apparent from the following detailed description of the preferred embodiments of the invention in conjunction with the drawings wherein.

DETAILED DESCRIPTION OF THE PREFERRED EMBODIMENT

Figure 1:
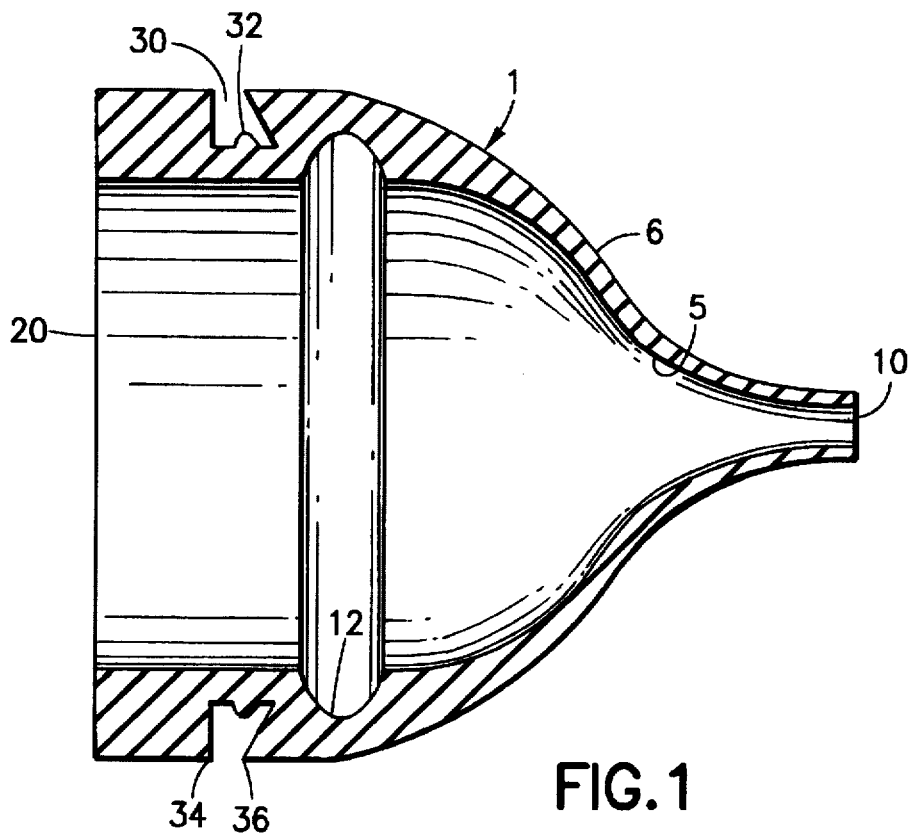
FIG. 1 is a longitudinal section of a grommet according to a first embodiment of the invention.

In a first embodiment shown in FIG. 1, a grommet for sealing an opening in a panel through which at least one cable passes includes a unitary tapered hollow body formed of rubber or any other suitable flexible and elastically deformable material. The grommet 1 has one first tapered end 10 which is provided for sealingly receiving or engaging the cable or wiring harness. In continuation to the first end 10, a tapered body portion which is defined by an inner surface 5 and an outer surface 6 extends. At the end, having a larger diameter, of the tapered portion, a groove 30 is formed. The groove 30 has, in the shown embodiment, two outer edges 34, 36 which provide a line contact with an unillustrated panel inserted into the groove 30. The edges 34, 36 are formed as sealing lips. The cross section of the groove 30 corresponds essentially to a trapezoid, most specifically to such a trapezoidal form having a right angle. The groove 30 has the largest width at the bottom thereof. At the bottom of the groove 30 is provided a radial projection 32 which serves as a sealing lip when engaging the edge of the panel inserted into the groove 30. A flange-like or disk-like second end 20 is provided adjacent to the groove 30. On the inner surface 5, a recess 12 is formed behind the groove 30 when seen in the axial direction from the second end 20. In this embodiment, the recess 12 extends substantially over the entire circumference of the inner surface 5 of the grommet 1. The width and depth of the recess 12 are chosen such that a desired amount of material forming the grommet 1 can be received therein upon deformation. In the shown embodiment, the width and depth of the recess 12 correspond essentially to the half of the wall thickness of the grommet 1 at the location adjacent to the recess 12.

Figure 2:
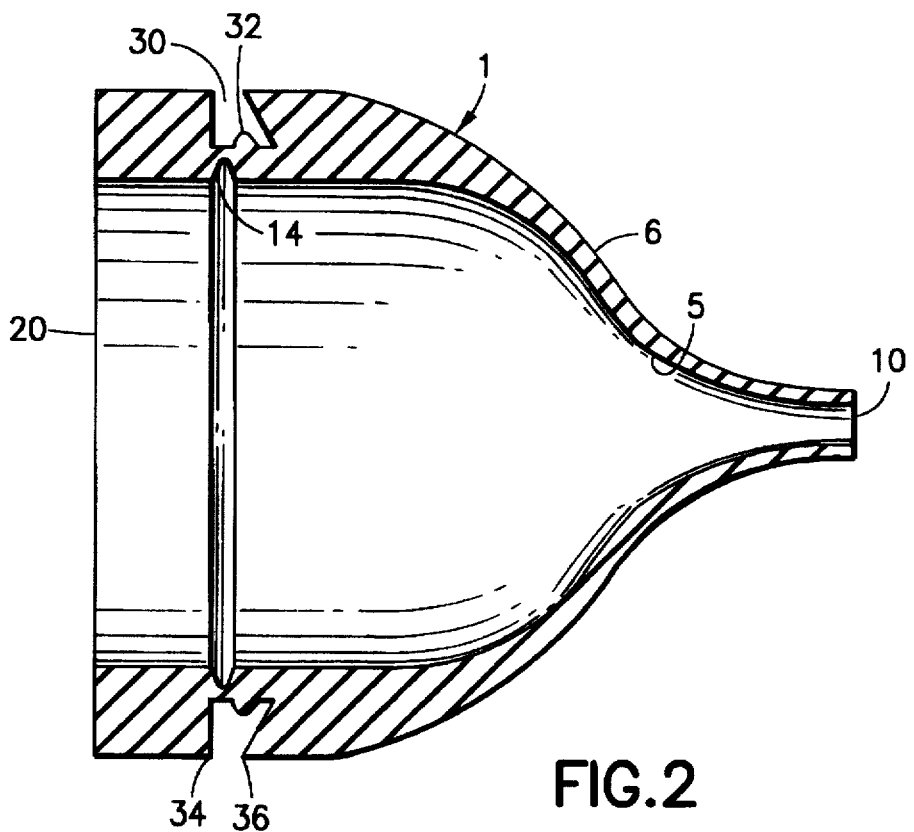
FIG. 2 is a longitudinal section of a grommet according to a second embodiment of the invention.

The basic construction of a grommet shown in FIG. 2 is similar to that of the grommet 1 shown in FIG. 1 except in the point that a recess 14 is formed at a location substantially within the area of the bottom of the groove 30. The recess 14 extends over the entire circumference of the inner surface 5 of the grommet 1. The recess 14 is displaced with respect to the radial projection 32 such that the elastically restoring force of the grommet acting on the radial projection 32 is not impaired.

Figure 3:
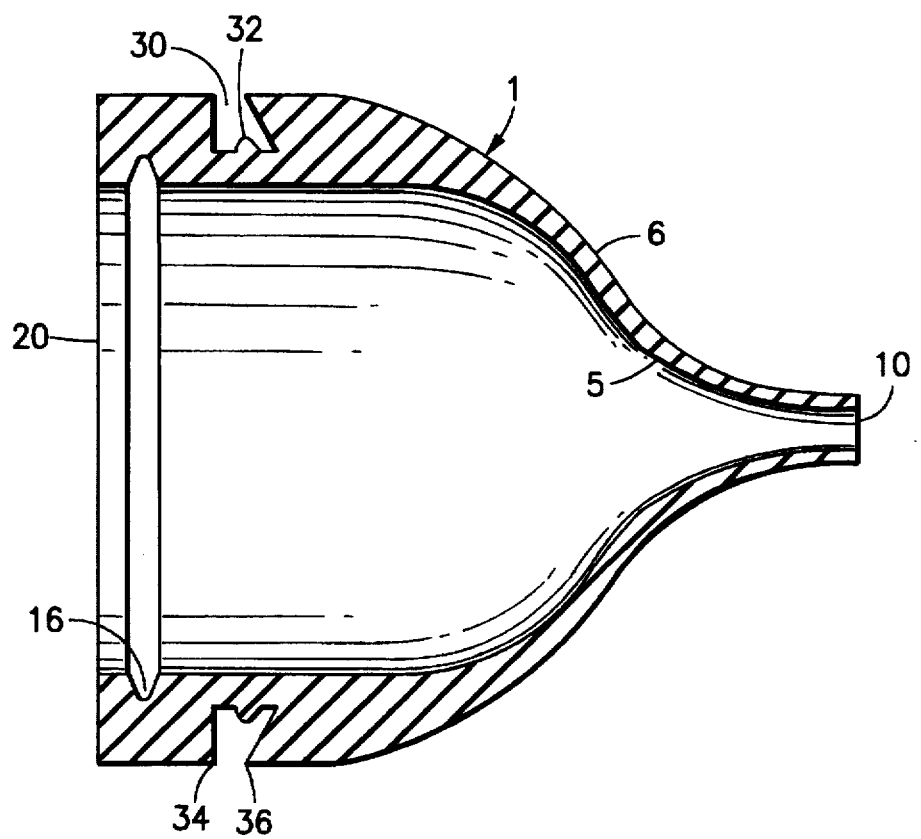
FIG. 3 is a longitudinal section of a grommet according to a third embodiment of the invention.

In the embodiment shown in FIG. 3, a recess 16 is provided adjacent to the second end 20 of the grommet 1 and before the groove 30 when seen in the axial direction from the second end 20. The width and depth of the recess 16 which extends over the entire circumference of the inner surface 5 of the grommet 1 are about 25% of the material thickness adjacent to the recess 16. The recess 16 particularly facilitates deformation of the second end portion of the grommet 1, facilitating the first step of the mounting operation of the grommet 1, e.g. the insertion of the grommet into the opening.

Figure 4:
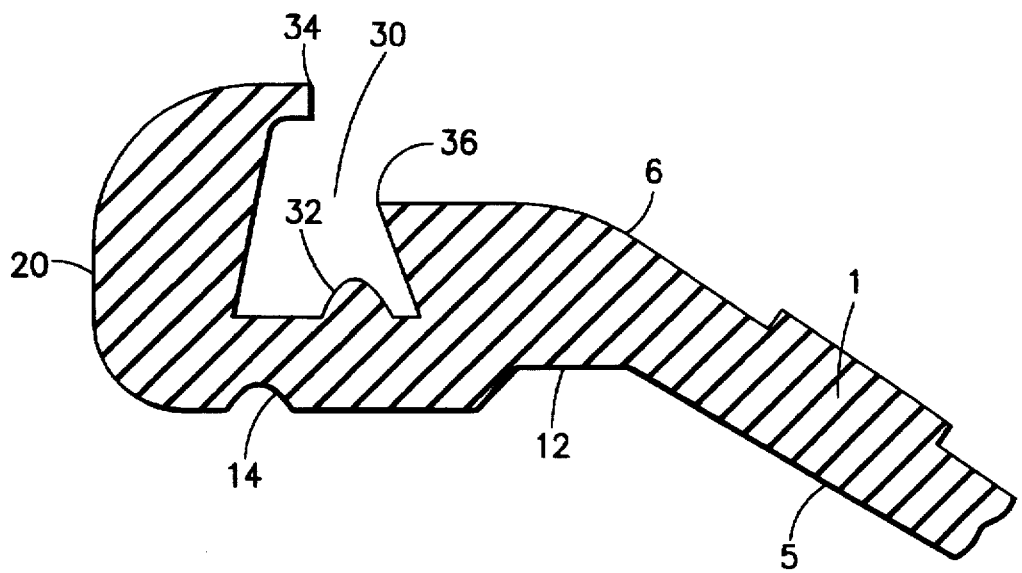
FIG. 4 is a longitudinal section of a portion of a grommet according to a fourth embodiment of the invention.

FIG. 4 shows a particularly preferred grommet having a recess 12 of polygonal cross section and a recess 14 of a semi-circular cross section. The recess 12 has a depth approximately 1.5 times the depth of the recess 14. The depth of the recess 14 corresponds approximately to ⅓ to ½ of the material thickness at the location of the groove 30. The recess 14 is distanced from the groove 30 such that a portion of the grommet 1 connecting the recess 14 and the groove 30 has a sufficient strength.

The recess 14 is, similar to the embodiment shown in FIG. 2, offset with respect to the sealing lip 32. In this embodiment, the second end 20 has an appreciably large diameter in order to securely engage the edge of the unillustrated panel. The side walls of the groove 30 are slightly slanted toward each other in order to provide the line contact with the panel to be engaged. One outer edge 34 of the groove 30 projects inwardly of the groove 30, thereby forming a sealing lip.

As in the foregoing embodiments, the recesses 12, 14 extend over the entire circumference of the inner surface 5.

It should be noted that the other features described in the foregoing embodiment are also applicable to this particularly preferred embodiment.

Figure 5:
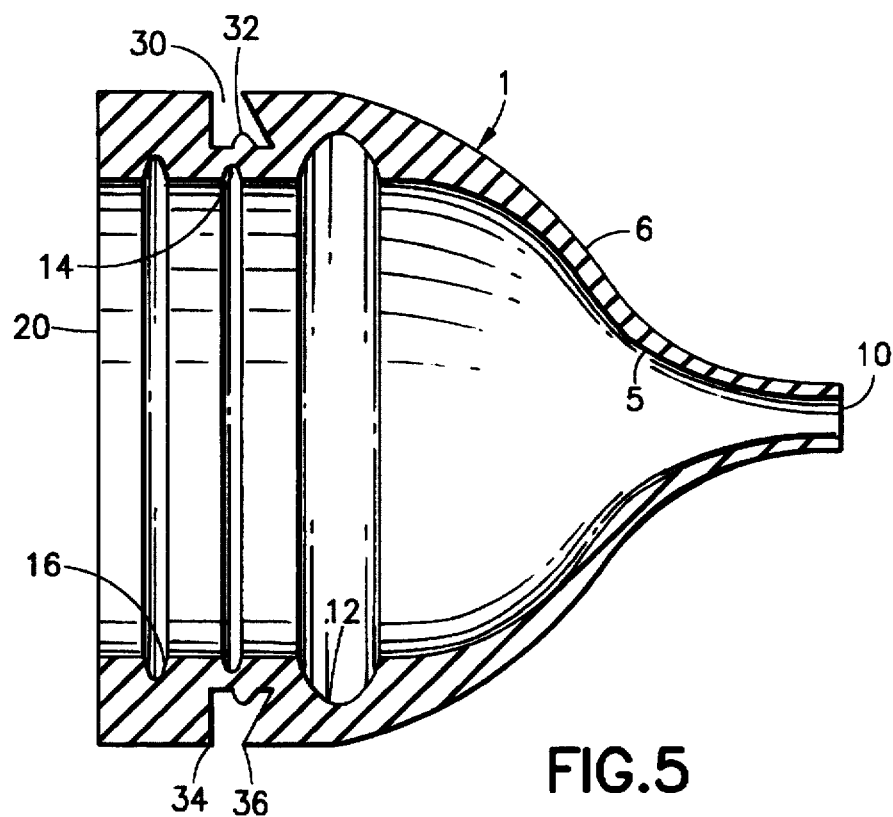
FIG. 5 is a longitudinal section of a grommet according to a fifth embodiment of the invention.

FIG. 5 shows one preferred embodiment comprising the three recesses of FIGS. 1 to 3 in combination. It should be noted that only one or two recesses or more than 3 recesses may be provided in combination. All or some of the recesses shown in the embodiments of FIGS. 1 to 5 could also be located on the outer surface 6 of the grommet. The form of the recesses is not limited to the one shown in the foregoing embodiments, but may also be rectangular or triangular.

Figure 6:
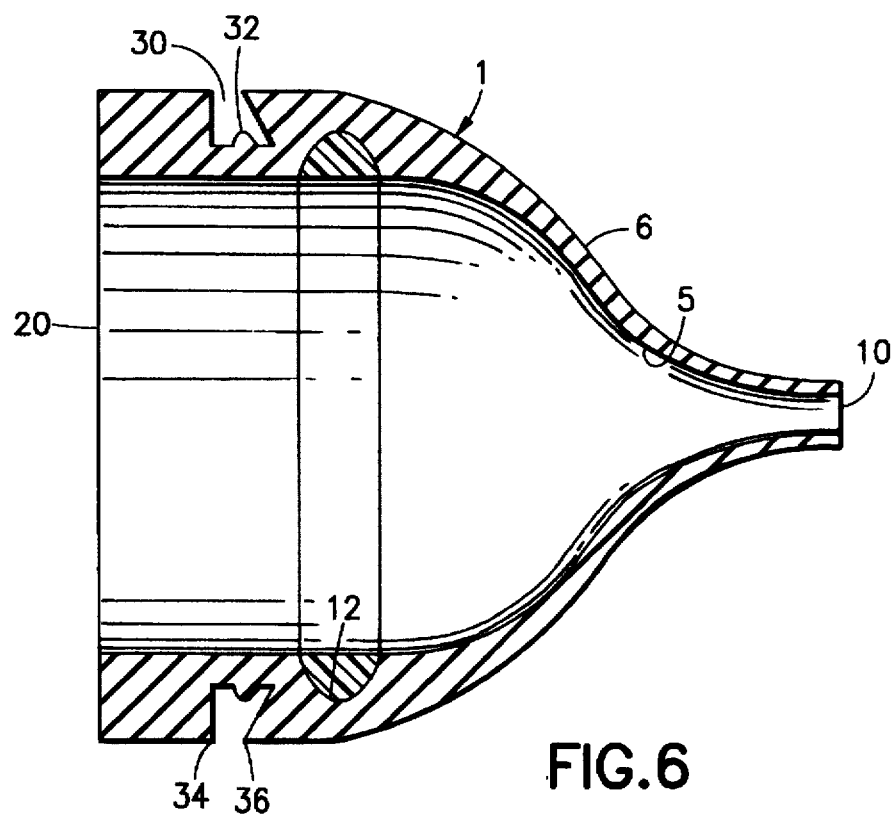
FIG. 6 is a longitudinal section of a grommet according to a sixth embodiment of the invention.

FIG. 6 shows a further preferred embodiment of the inventive grommet. The structure of the grommet is very similar to the one shown in FIG. 1. However, in this sixth embodiment, means for reducing stiffness is formed by a recess which is filled at least partially with a softer material than the rubber forming the grommet. By using a softer or more easily deformable material, substantially the same effects as by providing recesses according to the previous embodiments can be obtained. Besides the use of the softer material for filling recesses, a softer or more elastic material can also be used to at least partially form the tapered portion of the grommet. Though unillustrated, the tapered portion may have a corrugated form so that it is more easily deformable.

It should be noted that the inventive grommet may have any suitable cross sectional form, e.g. a round, rectangular, or elliptical form.

The inventive grommet facilitates the sealing of an opening in the panel through which at least one cable passes, in particular under restricted space conditions. For mounting the inventive grommet, the operator only needs one hand and substantially reduced effort.

What is claimed is:

1. A grommet (1) for sealing an opening in a panel, through which at least one cable passes, said grommet (1) comprising a tapered hollow body having an inner surface (5), an outer surface (6), a first end (10) which sealingly engages the cable and a second end (20), a groove (30) formed in the outer surface (6) in proximity to the second end (20), said groove (30) being dimensioned such that portions of the outer surface (6) adjacent said groove (30) are engageable with portions of said panel adjacent said opening, wherein at least one stiffness reducing means for reducing stiffness and facilitating inward deformation of the second end (12, 14, 16) is provided on the hollow body, said stiffness reducing means (12, 13, 14) comprising at least one recess extending at least partly around said hollow body in proximity to said groove (30), said hollow body defining a thickness at said recess which is less than thicknesses of said hollow body at locations immediately adjacent said recess so that elastic deformation of the second end (20) of the grommet (1) is facilitated.

2. A grommet (1) according to claim 1, wherein the said at least one recess (12, 14, 16) is formed on said inner surface (5).

3. A grommet (1) according to claim 2, wherein at least one recess (12, 16) is disposed between said groove (30) and one of said first and second ends (10, 20) of said hollow body.

4. A grommet (1) according to claim 2, wherein said at least one recess (14) is at a location on said inner surface (5) substantially aligned with said groove (30).

5. A grommet (1) according to claim 1, wherein said at least one recess (12, 14, 16) extends continuously around the hollow body.

6. A grommet (1) according to claim 1, wherein said stiffness reducing means further comprises a material that is less stiff than said hollow body.

7. A grommet (1) according to claim 1, wherein the groove (30) has its largest width at the bottom.

8. A grommet (1) according to claim 1, wherein the groove (30) is defined by edges (34, 36), said edges of the groove (30) being shaped to form sealing lips.

9. A grommet (1) according to claim 1, wherein a radial projection (32) defining a sealing lip is formed on a portion of the groove (30).

10. A grommet (1) according to claim 1, wherein the hollow body includes a tapered portion radially extending therefrom in proximity to both the second end (20) and the groove (30), said tapered portion being easily deformable for sealing engagement with the panel.

11. A grommet (1) according to claim 10, wherein said easily deformable portion of said hollow body in proximity to both said second end (20) and said groove (30) is of substantially wave-shape.

12. A grommet (1) for sealing an opening in a panel through which at least one cable may pass, said grommet comprising a tapering hollow body having an inner surface (5) and an outer surface (6), said hollow body further having a cross-sectionally small first end (10) dimensioned such that portions of said inner surface (5) adjacent said first end are sealingly engageable with said cable, said hollow body further having a cross-sectionally large second end (20), a groove (30) formed on portions of said outer surface (6) substantially adjacent said second end (20), said second end (20) and said groove (30) being dimensioned for sealing engagement with said panel adjacent said opening therein, said inner surface (5) of said hollow body being formed with at least one recess (12, 14, 16), said hollow body defining a thickness at said at least one recess which is less than thicknesses of said hollow body at locations immediately adjacent said recess for substantially reducing stiffness of said hollow body at said recess for facilitating deformation of hollow body during engagement of said grommet with said panel.

13. A grommet (1) according to claim 12, wherein at least one recess is disposed between said groove (30) and said second end (20).

14. A grommet (1) according to claim 12, wherein at least one recess is disposed between said groove (30) and said first end (10).

15. A grommet (1) according to claim 12, wherein at least one recess (14) is aligned with a portion of said groove (30).

16. A grommet (1) according to claim 12, wherein at least one recess comprises a first recess disposed between said groove (30) and said second end (20) and a second recess disposed between said groove (30) and said first end (10).

17. A grommet (1) according to claim 12, wherein said outer surface (6) includes at least one sealing lip (32) for sealingly engaging said panel adjacent said opening therein.

18. A grommet (1) according to claim 17, wherein said sealing lip (32) is disposed within said groove (30).

19. A grommet (1) for sealing an opening in a panel through which at least one cable may pass, said grommet comprising a tapering hollow body having an inner surface (5) and an outer surface (6), said hollow body further having a cross-sectionally small first end (10) dimensioned such that portions of said inner surface (5) adjacent said first end are sealingly engageable with said cable, said hollow body further having a cross-sectionally large second end (20), a groove (30) formed on portions of said outer surface (6) substantially adjacent said second end (20), said second end (20) and said groove (30) being dimensioned for sealing engagement with said panel adjacent said opening therein, said inner surface (5) of said hollow body being formed with at least one recess (12, 14, 16) for substantially reducing stiffness of said hollow body for facilitating engagement of said grommet with said panel, wherein said hollow body is unitarily formed from a material having a selected stiffness and wherein said grommet (1) further comprises a material (12') disposed in said at least one recess (12, 14, 16) and exhibiting a stiffness less than said hollow body.

20. A grommet (1) according to claim 1, wherein said at least one recess (12, 14, 16) is closer to the second end (20) of said hollow body than to the first end (10) thereof.

* * * * *